(12) United States Patent
Gretz

(10) Patent No.: US 7,462,775 B1
(45) Date of Patent: Dec. 9, 2008

(54) ADJUSTABLE ELECTRICAL BOX FOR FLUSH OR OFFSET MOUNTING OF ELECTRICAL DEVICES ON BRICK OR STONE WALLS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/893,695

(22) Filed: Aug. 17, 2007

Related U.S. Application Data

(63) Continuation-in-part of application No. 11/821,730, filed on Jun. 25, 2007.

(51) Int. Cl.
 *H02G 3/08* (2006.01)
(52) U.S. Cl. .................. 174/50; 174/58; 174/64; 174/135; 220/4.02; 439/535; 248/906
(58) Field of Classification Search .............. 174/50, 174/58, 57, 64, 63, 135; 220/3.6, 3.9, 3.92, 220/3.5; 439/535; 248/906; 33/528; 361/600
See application file for complete search history.

(56) References Cited

U.S. PATENT DOCUMENTS

| | | | |
|---|---|---|---|
| 2,622,756 A * | 12/1952 | Appleton | 220/3.94 |
| 2,736,450 A | 2/1956 | Atkinson | |
| 3,525,450 A * | 8/1970 | Payson | 220/3.7 |
| 4,569,458 A * | 2/1986 | Horsley | 220/3.6 |
| 4,634,015 A * | 1/1987 | Taylor | 220/3.7 |
| 4,693,438 A | 9/1987 | Angell | |
| 4,927,039 A * | 5/1990 | McNab | 220/3.7 |
| 5,042,673 A | 8/1991 | McShane | |
| 6,894,222 B2 | 5/2005 | Lalancette et al. | |
| 6,956,172 B2 | 10/2005 | Dinh | |
| 7,087,837 B1 | 8/2006 | Gretz | |
| 7,117,591 B1 | 10/2006 | Gretz | |

\* cited by examiner

*Primary Examiner*—Dhiru R Patel

(57) ABSTRACT

An adjustable electrical box assembly for mounting an electrical device on a stone wall either flush with the wall or at a desired offset. The assembly includes a base member, anchoring members, an electrical box, and an optional base extender. For a wall constructed of narrow depth stones, the base member is mounted directly to the substrate using the anchoring members. For a wall constructed of thick stones, the base member and base extender are secured together with the anchoring members and the assembly is secured to the substrate. The offset of the electrical box from the wall surface is set by adjusting the position of attachment of the anchoring members with respect to the sidewalls of the base member and base extender. The electrical box is adapted to receive a light fixture or similar electrical device.

19 Claims, 19 Drawing Sheets

ADJUSTABLE ELECTRICAL BOX FOR FLUSH OR OFFSET MOUNTING OF ELECTRICAL DEVICES ON BRICK OR STONE WALLS

This application is a Continuation-In-Part of U.S. patent application Ser. No. 11/821,730 filed Jun. 25, 2007 and still pending, the entire contents of which are incorporated herein by reference.

FIELD OF THE INVENTION

This invention relates to electrical junction boxes and specifically to an adjustable electrical box assembly that enables mounting an electrical device to a stone wall in a flush or offset configuration depending on the homeowner's preference.

BACKGROUND OF THE INVENTION

Electrical boxes are commonly installed on the exterior walls of buildings to mount electrical fixtures and the like. For the homeowner, it is desirable to have the option of mounting the electrical fixture either flush with the outer wall surface or at some predetermined offset from the wall surface. Conventional electrical boxes typically include attached captive fasteners that enable mounting of the box by driving the fasteners sideways into a stud. Typically the conventional electrical box is mounted flush with the wall surface.

As a result of the substantial thickness of brick and stone wall coverings and their imperviousness to receive fasteners, conventional electrical boxes cannot easily be mounted to brick and stone walls. The standard method of installing electrical service to a structure having a stone wall is to mount a conventional plastic or metal electrical box and then cement the conventional box into the wall. Typically there is a ragged gap around the periphery of the electrical box that must be filled with cement. The cement around the periphery is typically visible from the front of the conventional box, and this typically detracts from the attractiveness of the installed box. Additionally, as a result of using only cement to secure the box, it is difficult to level the box with respect to the outer surface of the stone wall.

An additional challenge provided by stone wall construction is the fact that stone is provided in several thicknesses. It is therefore difficult to mount conventional electrical boxes flush or at a desired offset from the stone wall without special procedures such as building a framework to extend the box from the substrate. There is no arrangement on a conventional box to adjust the distance the box extends outward from the stone surface. The utility of the electrical box, including the accessibility to the electrical fixtures installed thereto, is enhanced if it is set at the desired offset distance with respect to the wall.

A further problem arises as the result of the smooth outer sidewalls of the conventional electrical box as there is no structure on the outer surface of the sidewalls for holding the electrical box fast within the mortar.

What is needed therefore is an electrical box for exterior stone walls that may be securely anchored to the substrate with fasteners, is easily leveled with respect to the wall, is capable of being mounted flush with the wall or at some predetermined offset with respect to the wall, is capable of being adjusted to fit various thicknesses of stone, and that provides an aesthetically pleasing installation.

SUMMARY OF THE INVENTION

The invention is an adjustable electrical box assembly for mounting an electrical device on a stone wall. The assembly includes a base member, anchoring members, an electrical box, and an optional base extender. The base member includes sidewalls with a plurality of outward extending tabs and a top wall with a forward extending lip. The anchoring members are substantially L-shaped with a short leg and a long leg. For a stone wall of narrow thickness, the base member is mounted directly to the substrate with the anchoring member and the electrical box is secured to the base member. The optional base extender is not used. The offset of the box from the stone wall may be adjusted by the orientation of the anchoring members. For a smaller offset, the short leg may be secured to the base member and the long leg to the substrate. For a larger offset, the long leg may be secured to the base member. For a wall constructed of thick stones, the base extender is secured to the substrate with the anchoring members and the base member and base extender are joined together and secured to the anchoring members. The offset of the electrical box from the wall surface is set by adjusting the position of the anchoring members with respect to the sidewalls of the base member and base extender. Outward extending tabs on the base member and the base extender provide a gap for receiving and guiding a leg of the anchoring member there between. A plurality of apertures is provided within the gap of the base member and base extender and an elongated slot is provided in each leg of the anchoring members. The outward extending tabs provide an anchor for mortar that is applied to the gap between the wall and the base portion of the electrical box assembly. After installing the base member or base member and base extender assembly to the substrate, the electrical box is secured to the base member with the rearward extending sidewalls of the electrical box received within the forward extending lip of the base member. The electrical box is adapted to receive a light fixture or similar electrical device.

OBJECTS AND ADVANTAGES

Several advantages are achieved with the adjustable electrical box assembly of the present invention, including:

(1) The adjustable electrical box assembly of the present invention enables easy mounting of electrical devices on structures with stone walls. Stone is provided in several of thicknesses, and the electrical box assembly of the present invention enables an installer to easily mount an electrical device flush or at some desired offset from the stone wall surface for any thickness of stone.

(2) The adjustable electrical box assembly includes anchoring members and fasteners that enable mounting of the box assembly to the wall substrate rather than anchoring merely with cement as in conventional electrical boxes.

(3) The plurality of anchoring members enables easy leveling of the electrical box with respect to the wall surface. If the substrate is rough or uneven, each of the four anchoring members can be adjusted individually with respect to the electrical box, thereby making it easy to obtain an installed box that is level with respect to the outer wall.

(4) The adjustable electrical box assembly of the present invention provides enhanced anchoring of mortar when it is used to fill around the base of the assembly. The adjustable electrical box assembly includes a plurality of tabs extending outwardly from the base member portion of the assembly to provide enhanced adherence to mortar.

(5) The outlet box and adapter of the present invention provides an aesthetically pleasing electrical box for mounting an electrical device to the exterior of a wall constructed of stone or similar materials such as brick.

These and other objects and advantages of the present invention will be better understood by reading the following description along with reference to the drawings.

TABLE OF NOMENCLATURE

Figure 1:
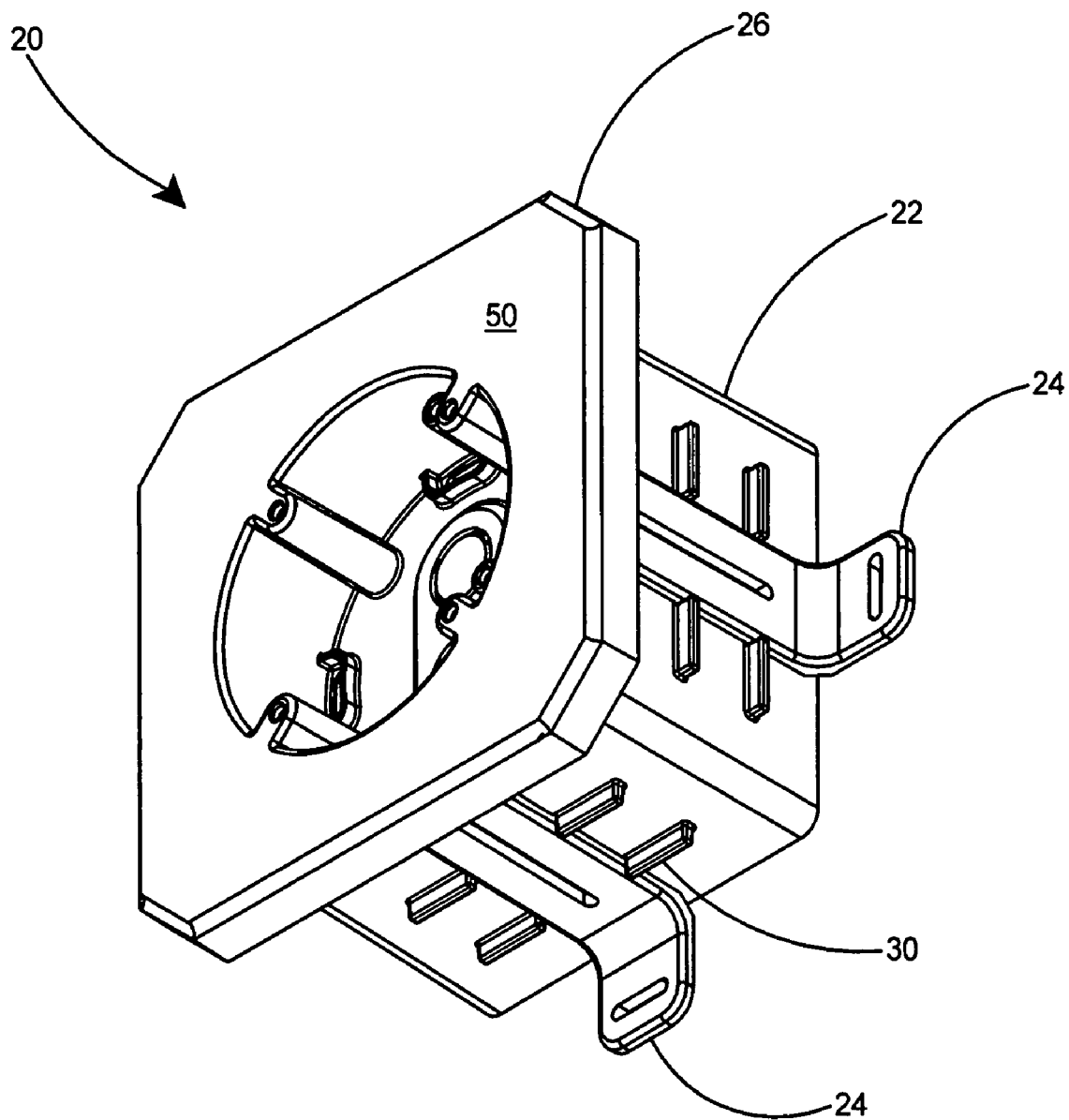
FIG. 1 is a perspective view of a first embodiment of an adjustable electrical box assembly according to the present invention.

The following is a listing of part numbers used in the drawings along with a brief description:

| Part Number | Description |
| --- | --- |
| 20 | adjustable electrical box assembly, first embodiment |
| 22 | base member |
| 24 | anchoring member |
| 26 | electrical box |
| 28 | sidewall of base member |
| 30 | tab |
| 32 | top wall of base member |
| 34 | lip |
| 36 | gap |
| 38 | aperture |
| 40 | inner periphery of lip |
| 42 | inner edge of lip |
| 44 | outer edge of lip |
| 46 | boss in base member |
| 48 | bore |
| 50 | peripheral flange of electrical box |
| 52 | sidewalls of electrical box |
| 54 | back wall of electrical box |
| 56 | electrical enclosure |
| 58 | boss in electrical box |
| 60 | bore |
| 62 | aperture in back wall of electrical box |
| 64 | apron |
| 66 | outer edge of peripheral flange |
| 68 | removable wall section |
| 70 | knockout |
| 72 | base leg |
| 74 | side leg |
| 76 | base slot |
| 78 | slot |
| 80 | first attachment arrangement |
| 82 | fastener |
| 84 | second attachment arrangement |
| 86 | fastener for securing electrical box to base member |
| 88 | hole in wall |
| 90 | brick wall |
| 92 | substrate |
| 94 | third attachment arrangement |
| 96 | fastener |
| 98 | mortar |
| 100 | rear edge of the base member |
| 102 | light fixture |
| 104 | bracket |
| 106 | nut |

-continued

| Part Number | Description |
|---|---|
| 108 | fastener for securing electrical fixture to electrical box |
| 110 | post |
| 200 | adjustable electrical box assembly, preferred embodiment |
| 202 | base member |
| 204 | base extender |
| 206 | anchoring member |
| 208 | electrical box |
| 210 | substrate |
| 212 | stone wall |
| 214 | frame member |
| 216 | open top |
| 218 | open bottom |
| 220 | sidewalls of base extender |
| 222 | top edge |
| 224 | aperture in base extender |
| 226 | peripheral lip of base extender |
| 228 | tab of base extender |
| 230 | longitudinal gap of base extender |
| 232 | long leg of anchoring member |
| 234 | short leg |
| 236 | inner slot in long leg |
| 238 | outer slot in long leg |
| 240 | slot in short leg |
| 242 | fastener |
| 244 | first mounting arrangement |
| 246 | fastener for securing assembly to substrate |
| 248 | second mounting arrangement |
| D1 | distance of offset of electrical box from wall |
| $H_B$ | height of sidewalls of base member |

DETAILED DESCRIPTION OF THE INVENTION

With reference to FIG. 1, there is shown the first embodiment of the present invention, an adjustable electrical box assembly 20 including a base member 22, one or more anchoring members 24, and an electrical box 26. The adjustable electrical box assembly 20 can be used to mount an electrical device to a brick or stone wall (not shown), either flush with the wall or at a predetermined offset based on the user's preference.

Figure 2:
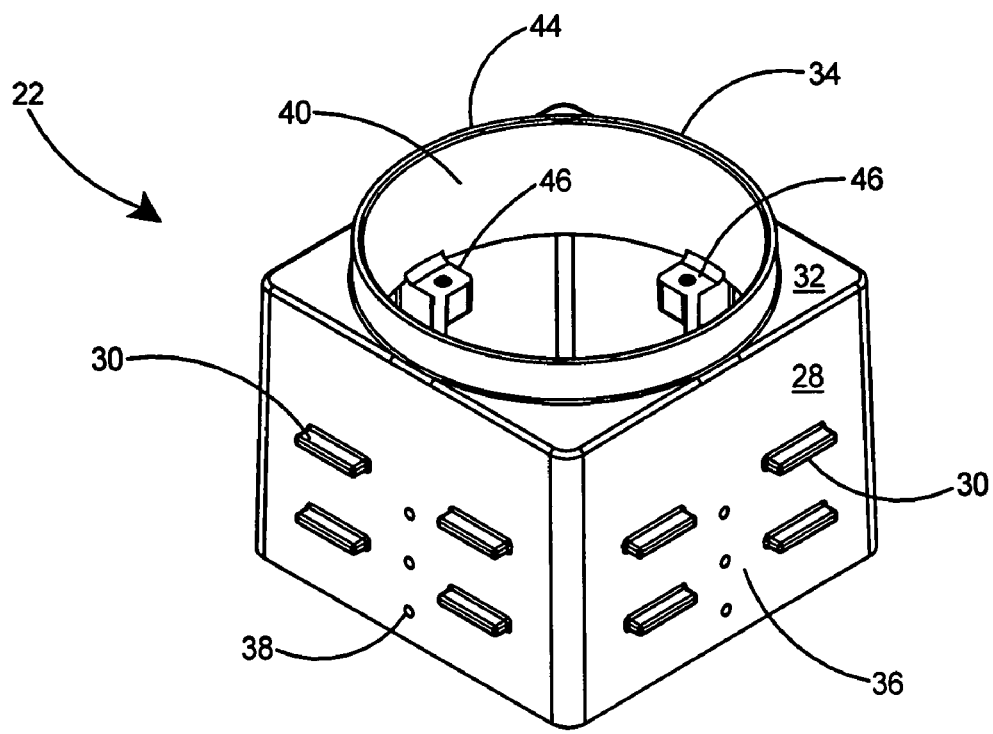
FIG. 2 is a perspective view of the base member portion of the adjustable electrical box assembly of FIG. 1.
Figure 3:
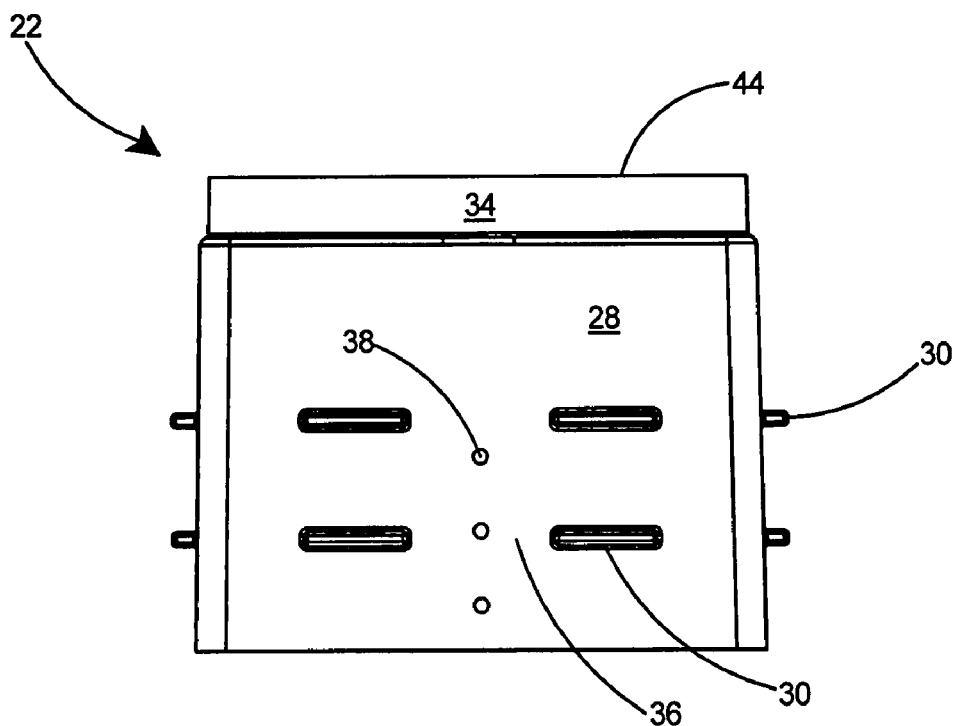
FIG. 3 is a side view of the base member of FIG. 2.

Referring to FIGS. 2 and 3, the base member 22 includes sidewalls 28, a plurality of outward extending tabs 30, a top wall 32, and a lip 34 extending from the top wall 32. The outward extending tabs 30 are arranged in pairs along each sidewall 28 of the base member 22 thereby defining a gap 36 there between. A plurality of apertures 38 is provided in linear alignment longitudinally along the sidewall 28 of the base member 22 within the gap 36. The lip 34 includes an inner periphery 40, an inner edge 42, an outer edge 44, and a plurality of bosses 46 along the inner periphery 40 of the base member 22 at the inner edge 42 of the lip 34.

Figure 4:
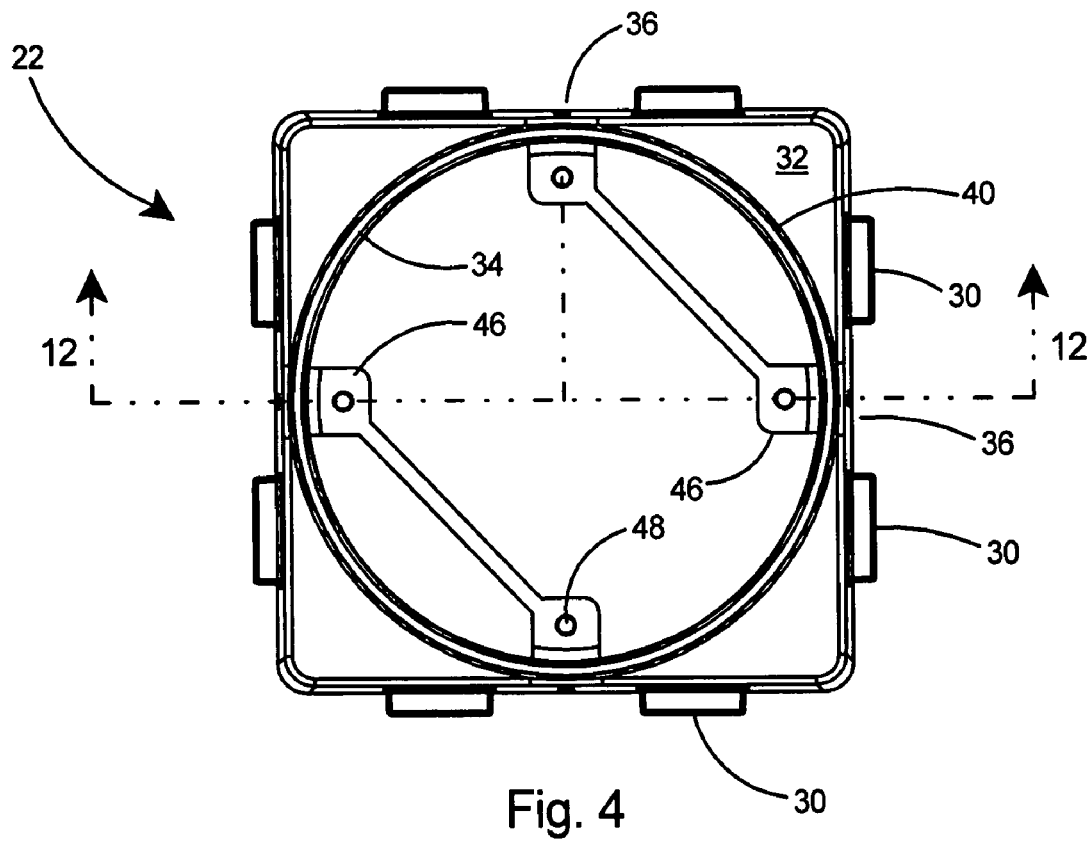
FIG. 4 is a top view of the base member of FIG. 2.

As shown in FIG. 4, the first embodiment of the base member 22 includes four bosses 46 including bores 48 therein spaced 90° apart around the inner periphery 40 of the forward extending lip 34. The tabs 30 extend outwardly from the sidewalls 28 of the base member 22.

Figure 5:
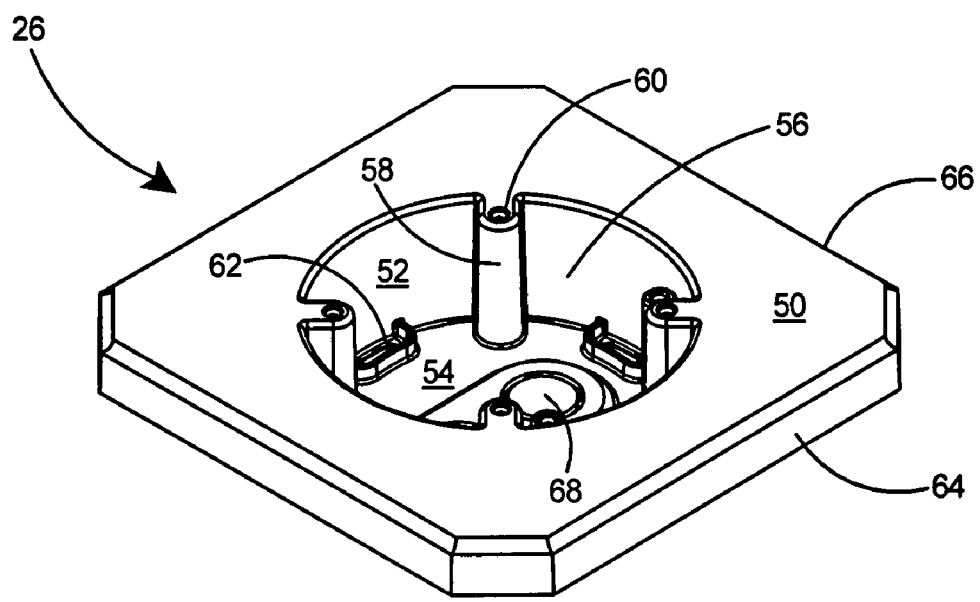
FIG. 5 is a perspective view of the electrical box portion of the adjustable electrical box assembly of FIG. 1.
Figure 6:
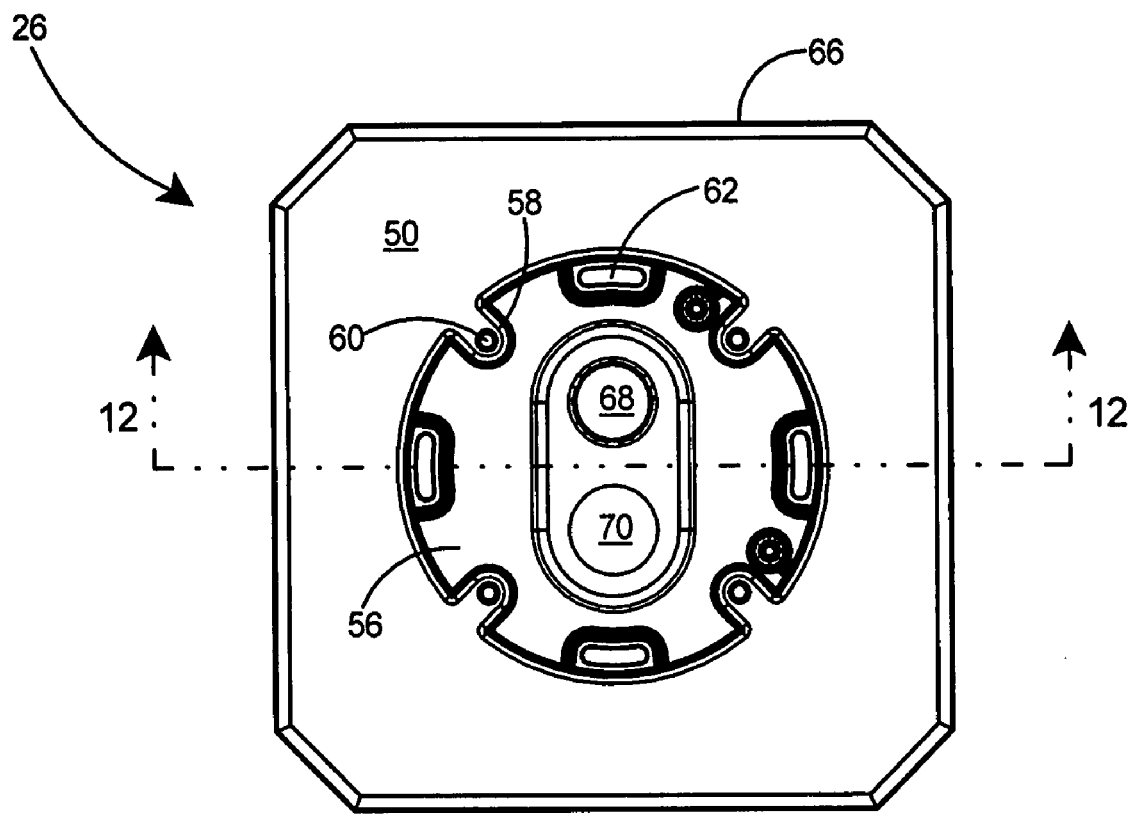
FIG. 6 is a top view of the electrical box of FIG. 5.
Figure 7:
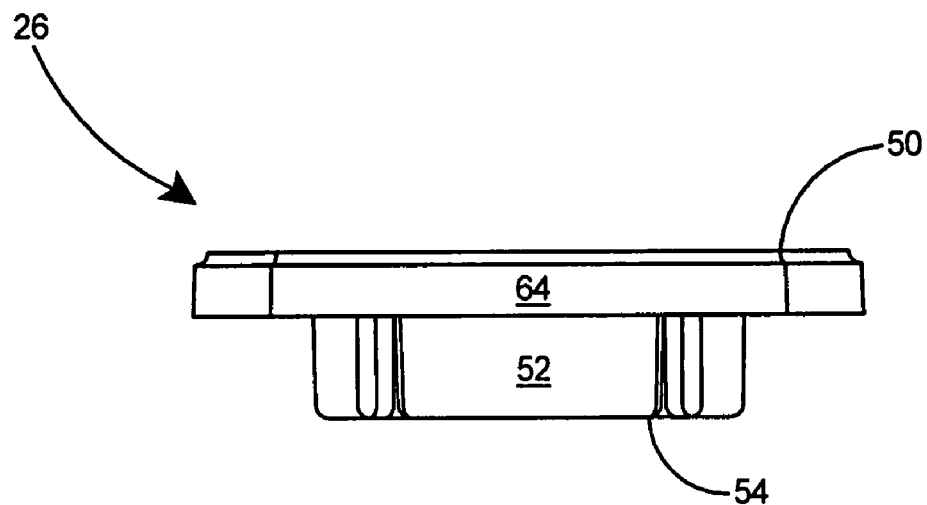
FIG. 7 is a side view of the electrical box of FIG. 5.
Figure 8:
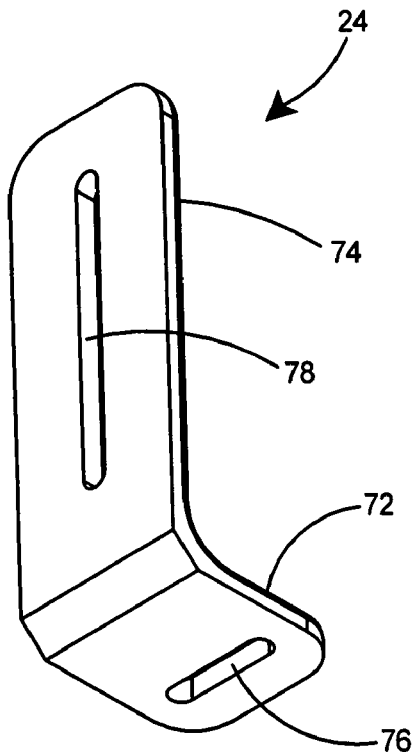
FIG. 8 is a perspective view of an anchoring member that forms a portion of the adjustable electrical box assembly of FIG. 1.
Figure 9:
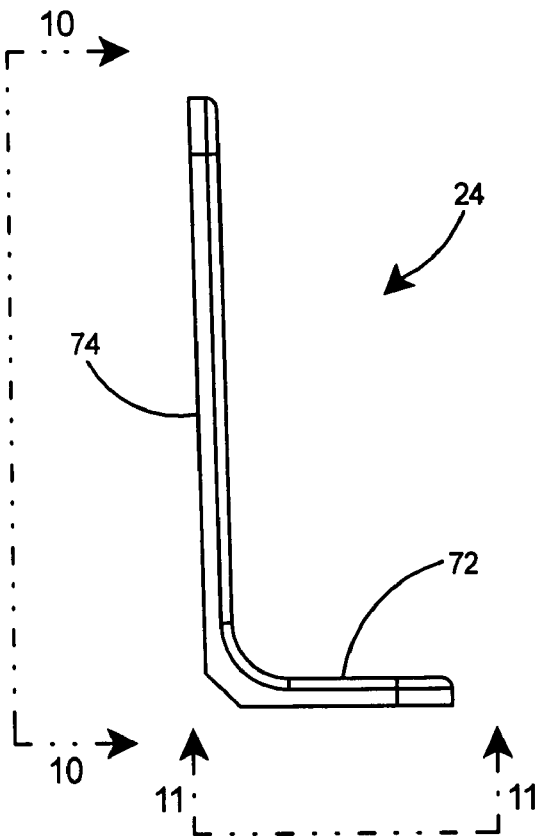
FIG. 9 is a side view of the anchoring member of FIG. 8.
Figure 10:
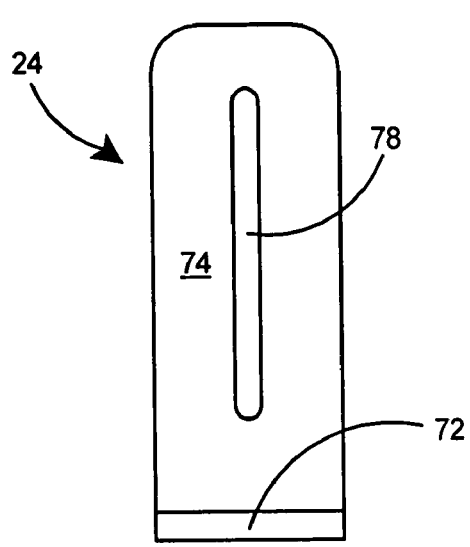
FIG. 10 is an end view of the anchoring member taken along line 10-10 of FIG. 8.
Figure 11:
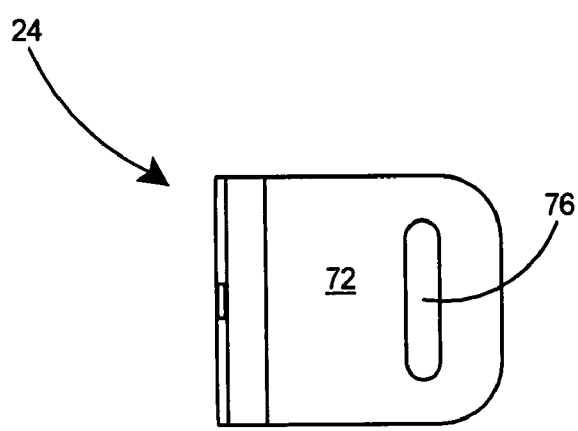
FIG. 11 is an end view of the anchoring member taken along line 11-11 of FIG. 8.

With reference to FIGS. 5-7 there is shown an electrical box 26 that forms a portion of the adjustable electrical box assembly of the present invention. The electrical box 26 includes a peripheral flange 50 and sidewalls 52 extending rearwards from the peripheral flange 50 to a back wall 54. The sidewalls 52 and back wall 54 define an electrical enclosure 56 therein that will later accommodate wiring for an electrical device (not shown). Bosses 58, each including a bore 60 therein, are integral with and extend from the inner periphery of the sidewalls 52. The electrical box 26 further includes apertures 62 in the back wall 54. As shown in FIGS. 5 and 7, the electrical box 26 includes an apron 64 that is integral with and extends rearward from the outer edge 66 of the peripheral flange 50. One or more removable wall sections 68 are provided in the back wall 54 of the electrical box 26, the removable wall sections 68 when removed there from thereby forming knockouts 70 (see FIG. 6) in the back wall 54 of the electrical box 26.

Referring to FIGS. 8-11, the anchoring member 24 is substantially L-shaped and includes a base leg 72 and a side leg 74. The base leg 72 includes a base slot 76 arranged laterally therein and the side leg 74 includes a slot 78 arranged longitudinally therein. The anchoring member 24 may be constructed of plastic or metal.

Figure 12:
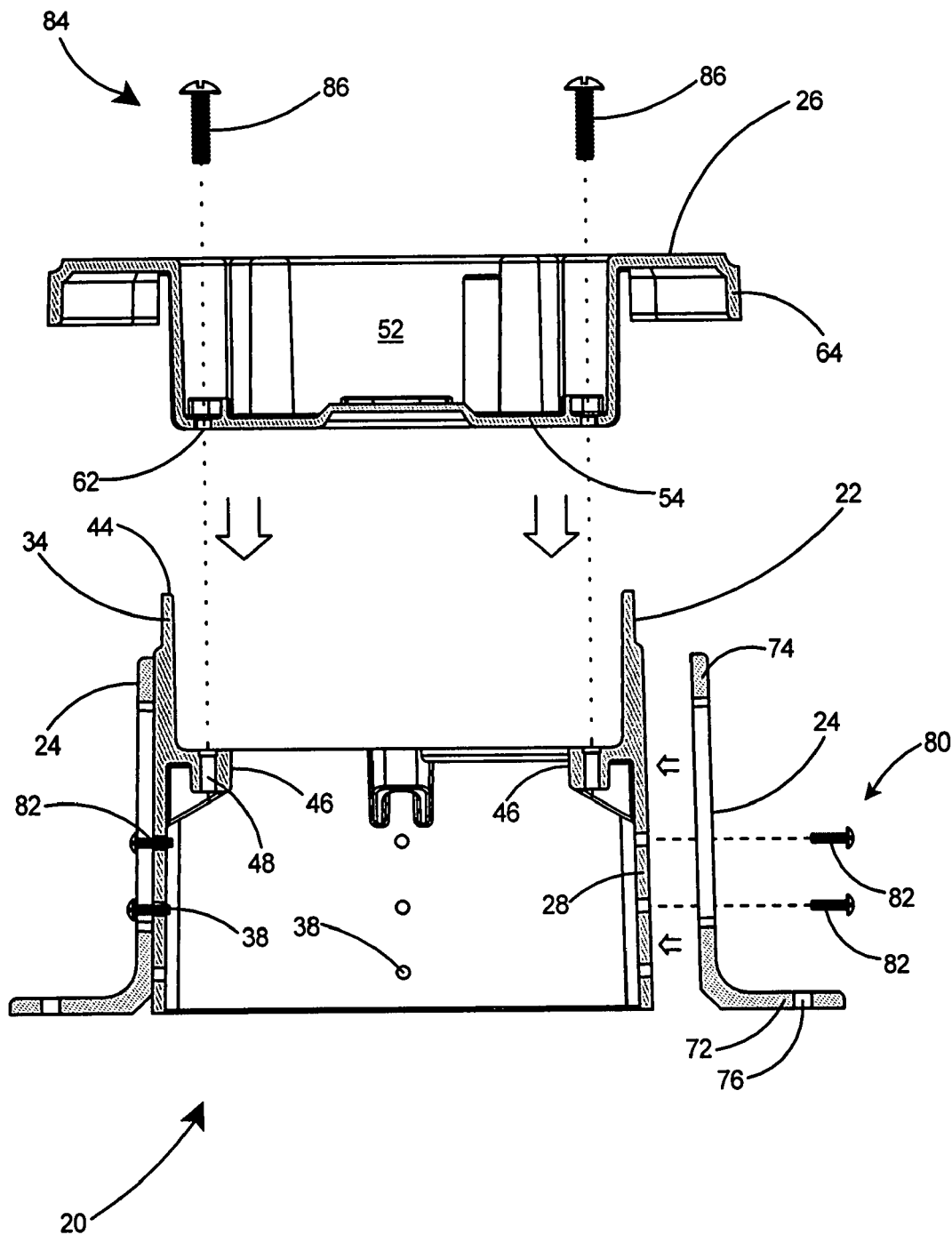
FIG. 12 is a sectional view of the electrical box taken along line 12-12 of FIG. 6 and a sectional view of the base member taken along line 12-12 of FIG. 4 with the electrical box in alignment with the base member and attached anchoring members to be joined thereto.

With reference to FIG. 12 there is shown an electrical box 26 exploded away from and in alignment with a base member 22 to be secured thereto in order to form an adjustable electrical box assembly 20 according to the present invention. The sidewalls 52 of the electrical box 26 are telescopically received within the lip 34 of the base member 22. The adjustable electrical box assembly 20 includes a first attachment arrangement 80 for securing each anchoring member 24 to the base member 22. The first attachment arrangement 80 includes one or more fasteners 82 for securing the anchoring member 24 to the sidewall 28 of the base member 22. The distance of the base leg 72 from the outer edge 44 of the lip 34 may be varied and selected to arrange for mounting the electrical box 26 flush with a wall (not shown) or at some desired offset from a wall.

Figure 13:
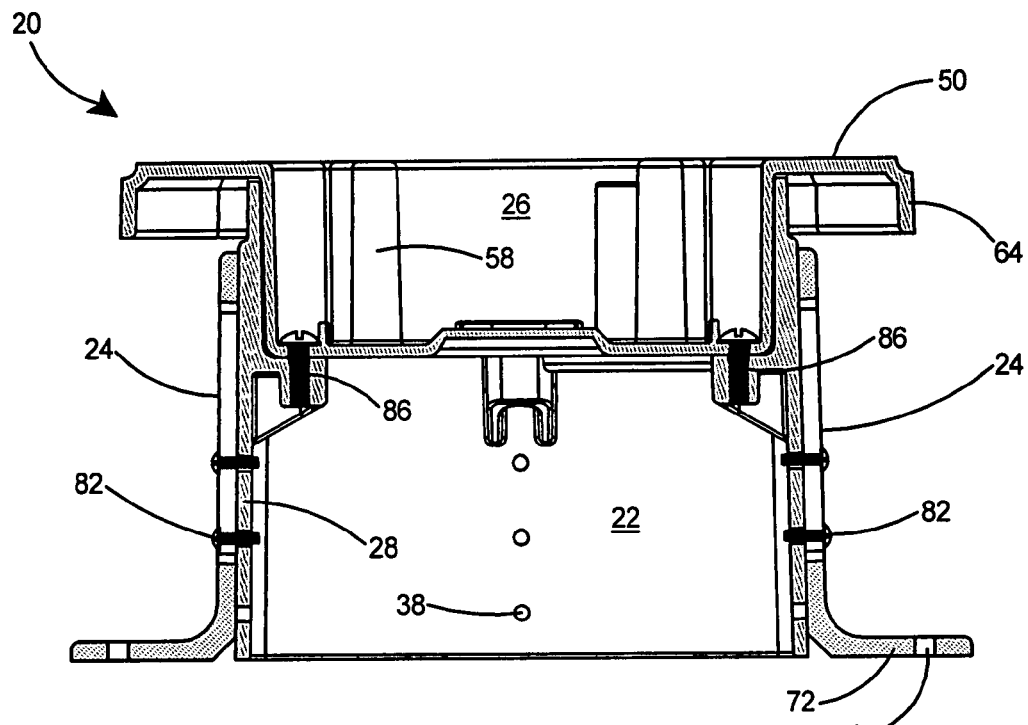
FIG. 13 is a sectional view of the electrical box, base member, and anchoring members of FIG. 12 after being secured together to form the adjustable electrical box assembly of the present invention.

As shown in FIG. 12, the adjustable electrical box assembly 20 includes a second attachment arrangement 84 for securing the electrical box 26 to the base member 22. The second attachment arrangement 84 includes fasteners 86 for securing through the apertures 62 in the back wall 54 of the electrical box 26 into the bosses 46 of the base member 22. FIG. 13 depicts the adjustable electrical box assembly 20 in the assembled state, after the anchoring members 24 have been secured to the base member 22 and the electrical box 26 has been secured to the base member 22.

Figure 14:
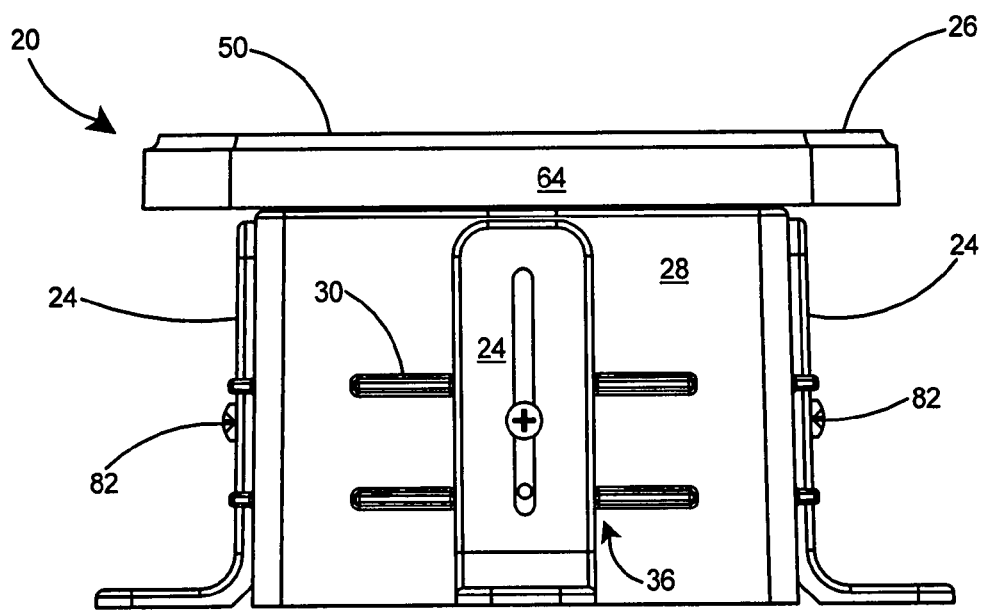
FIG. 14 is a side view of the adjustable electrical box assembly of FIG. 13.
Figure 15:
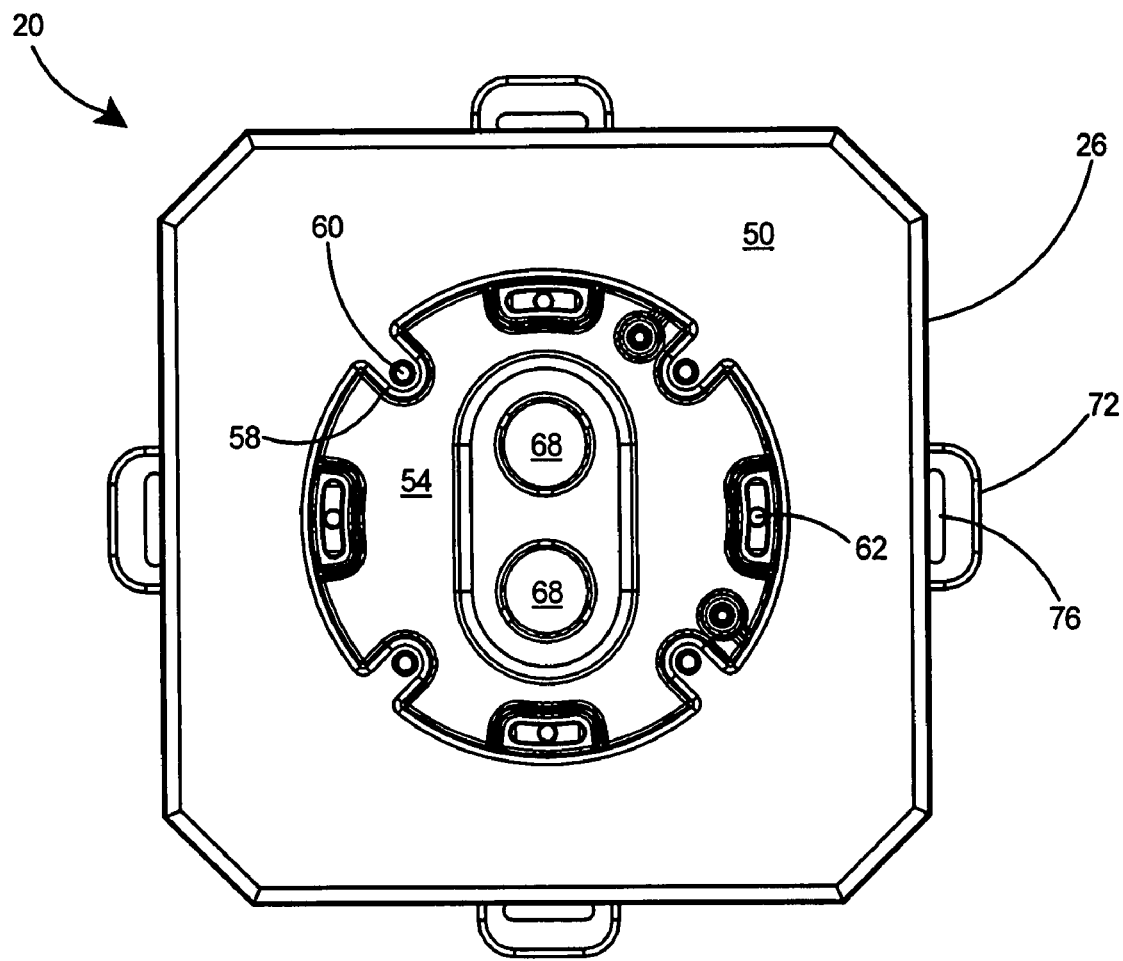
FIG. 15 is a top view of the adjustable electrical box assembly of FIG. 13.

As shown in FIG. 14, the anchoring member 24 is slideable within the gap 36 that is defined by the spaced apart tabs 30. When the adjustable electrical box assembly 20 has been fully assembled as shown in FIGS. 14 and 15, the peripheral flange 50 of the electrical box 26 extends laterally substantially beyond the sidewalls 28 of the base member 22 and obscures a substantial portion of the sidewalls 28 and the anchoring members 24 from view.

Figure 16:
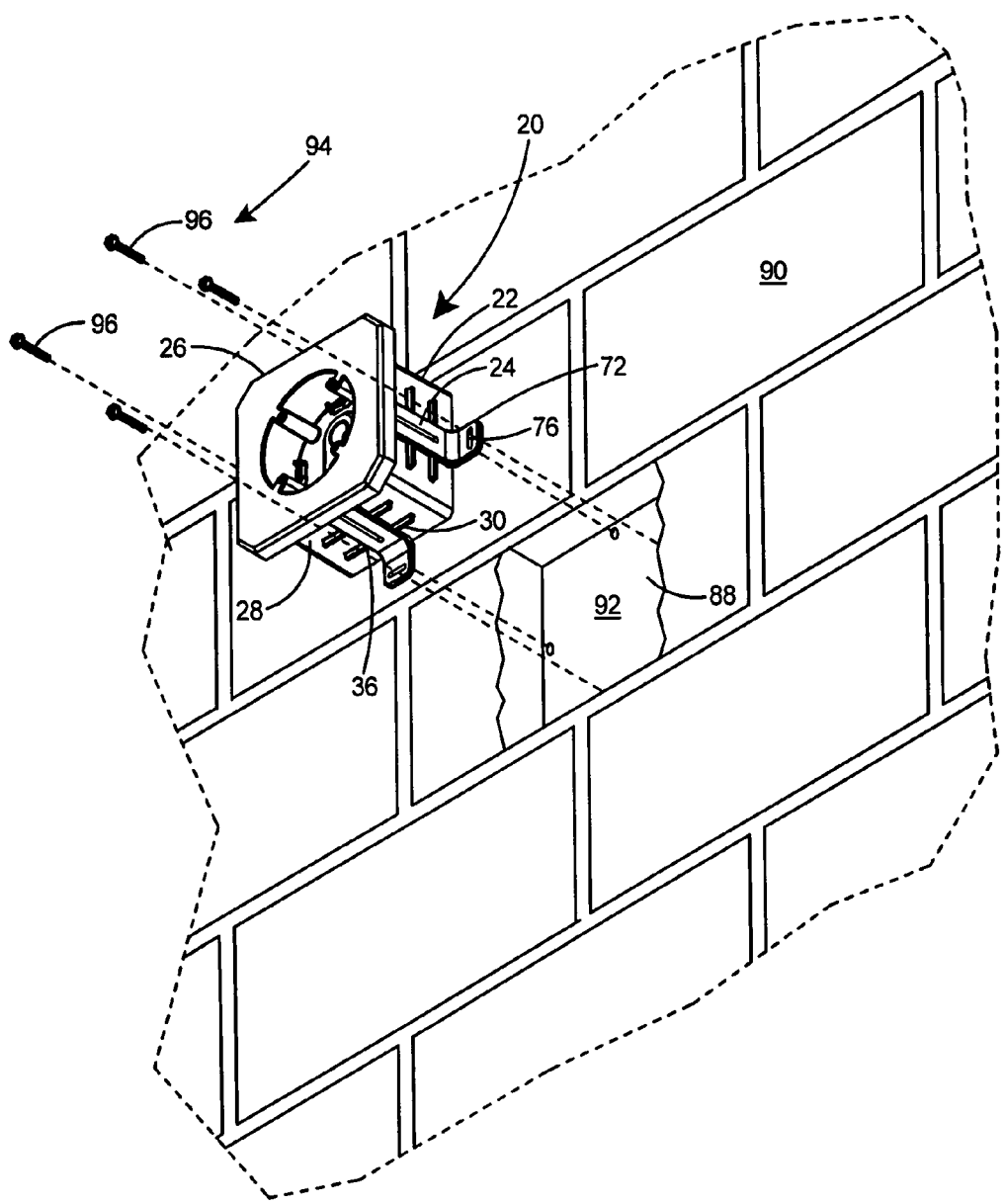
FIG. 16 is a perspective view of the first embodiment of the adjustable electrical box assembly according to the present invention exploded away from and in alignment to be inserted in a hole in a brick wall.

With reference to FIG. 16, the adjustable electrical box assembly 20 of the present invention is placed in operation by first creating a hole 88 in a stone or brick wall 90 to expose the substrate 92 which is typically formed of plywood or similar substrate material. A third attachment arrangement 94 includes fasteners 96 which cooperate with the base legs 72 and base slots 76 of the anchoring members 24 to secure the adjustable electrical box assembly 20 to the substrate 92. As described herein above, prior to securing the assembly to the wall the anchoring members 24 can be slid within the gaps 36 defined by the outward extending tabs 30 and secured in a user selected position within the gap 36. Thus, the user can set the offset of the electrical box 26 with respect to the wall 90 by selecting the position of the anchoring members 24 with respect to the base member 22. FIG. 16 depicts the anchoring members 24 set as far forward as possible with respect to the base member 22 which sets the electrical box 26 flush against the wall assuming the depth of the hole 88 is greater than the depth of the sidewalls 28. Conversely, the anchoring members 24 can be slid backward with respect to the sidewalls 28 and secured thereto, in which case the electrical box 26 will be offset with respect to the wall 90. The position of the anchoring members 24 with respect to the sidewalls 28 of the base member determines the amount of offset from the wall 90.

Figure 17:
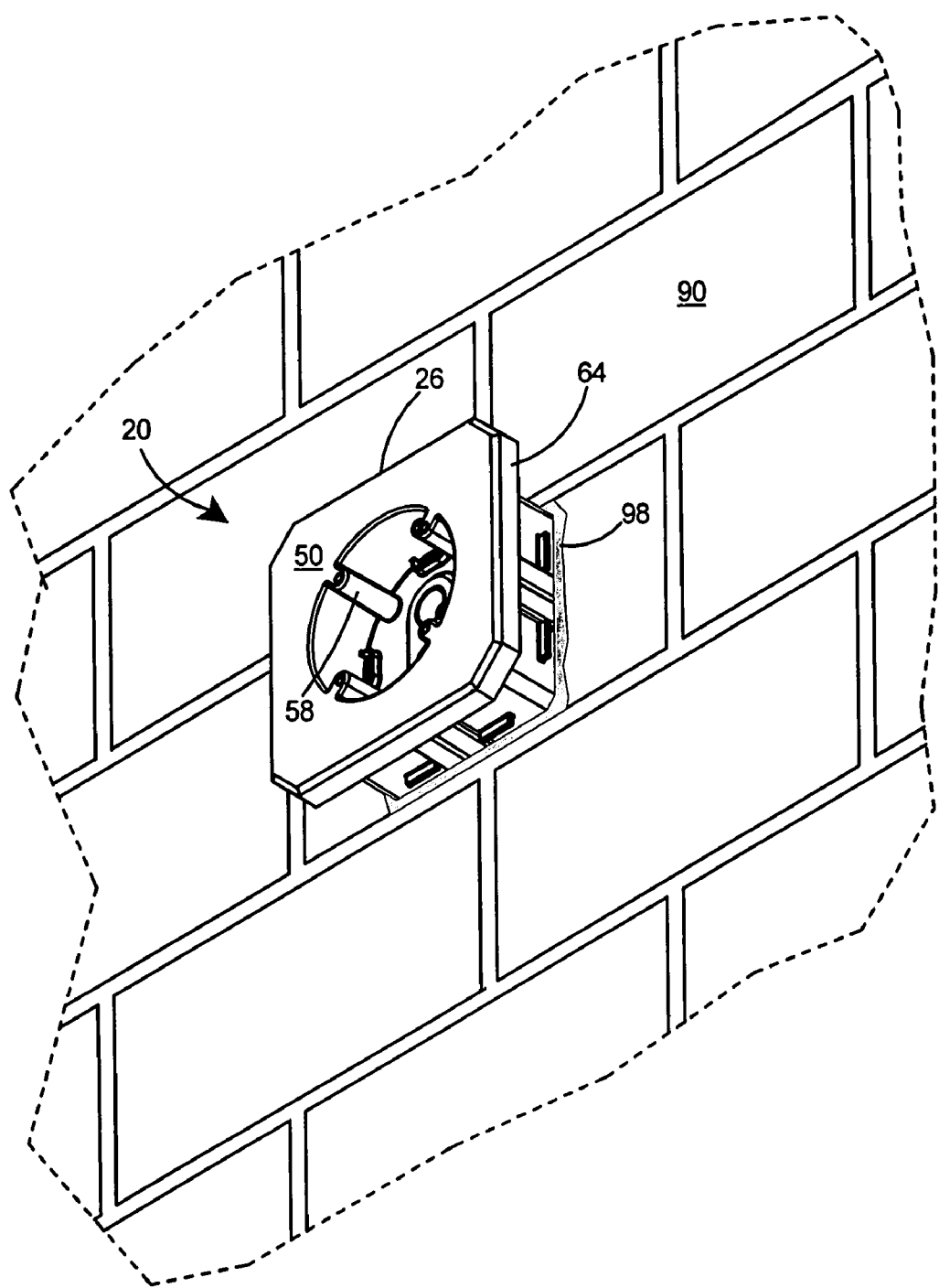
FIG. 17 is a perspective view of the first embodiment of the adjustable electrical box assembly according to the present invention after being secured to a brick wall.

FIG. 17 depicts an adjustable electrical box assembly 20 according to the present invention after being secured to a brick wall 90. As shown in FIG. 17, the electrical box has been installed at an offset from the wall. Mortar 98 has been used to fill the hole surrounding the adjustable electrical box assembly 20.

Figure 18:
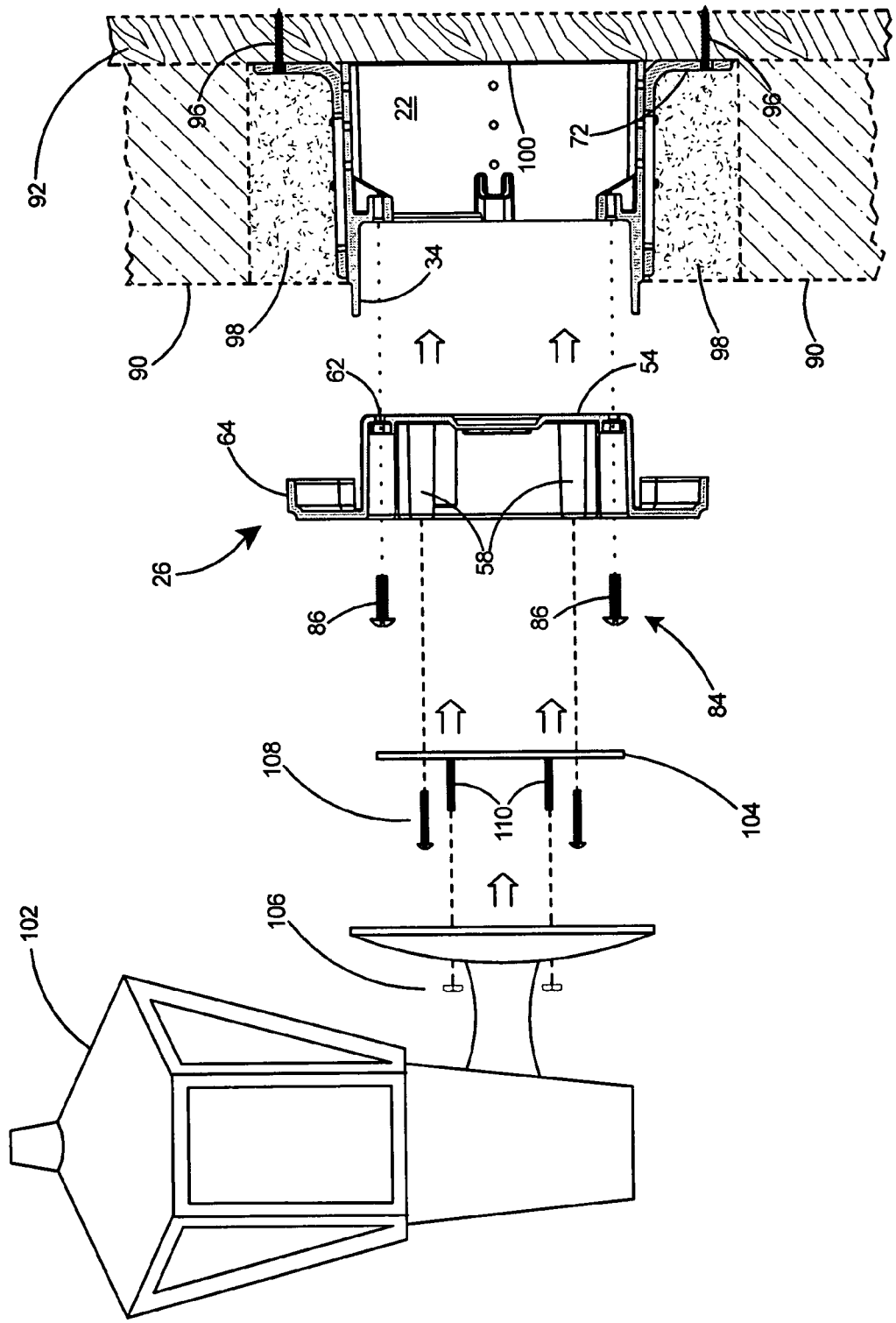
FIG. 18 is a side view of the electrical box exploded away from and in alignment with the base member and anchoring members to be secured thereto and a light fixture in alignment with the adjustable electrical box assembly according of the present invention to be secured thereto.

With reference to FIG. 18, an electrical box 26 is shown in alignment with a base member 22 that has been secured to a substrate 92 by fasteners 96 secured through the anchoring members 24. Mortar 98 is applied to fill the spaced between the base member 22 and the brick wall 90. In FIG. 18, the anchoring members 24 have been secured to the base member 22 in the most forward position with respect to the base member 22, thereby placing the base legs 72 flush with the rear edge 100 of the base member 22. The electrical box 26 will therefore be secured flush with the brick wall 90 with the rear of the apron 64 in contact with the wall 90. An electrical device, such as a light fixture 102, is secured to the adjustable electrical box assembly 20 using the complementary bracket 104 and nuts 106 supplied with the light fixture 102. The bores 60 in the bosses 58 of the electrical box 26 are capable of receiving fasteners 108 for securing the bracket 104 to the electrical box 26. The nuts 106 thread onto posts 110 that extend from the light fixture bracket 104.

Figure 19:
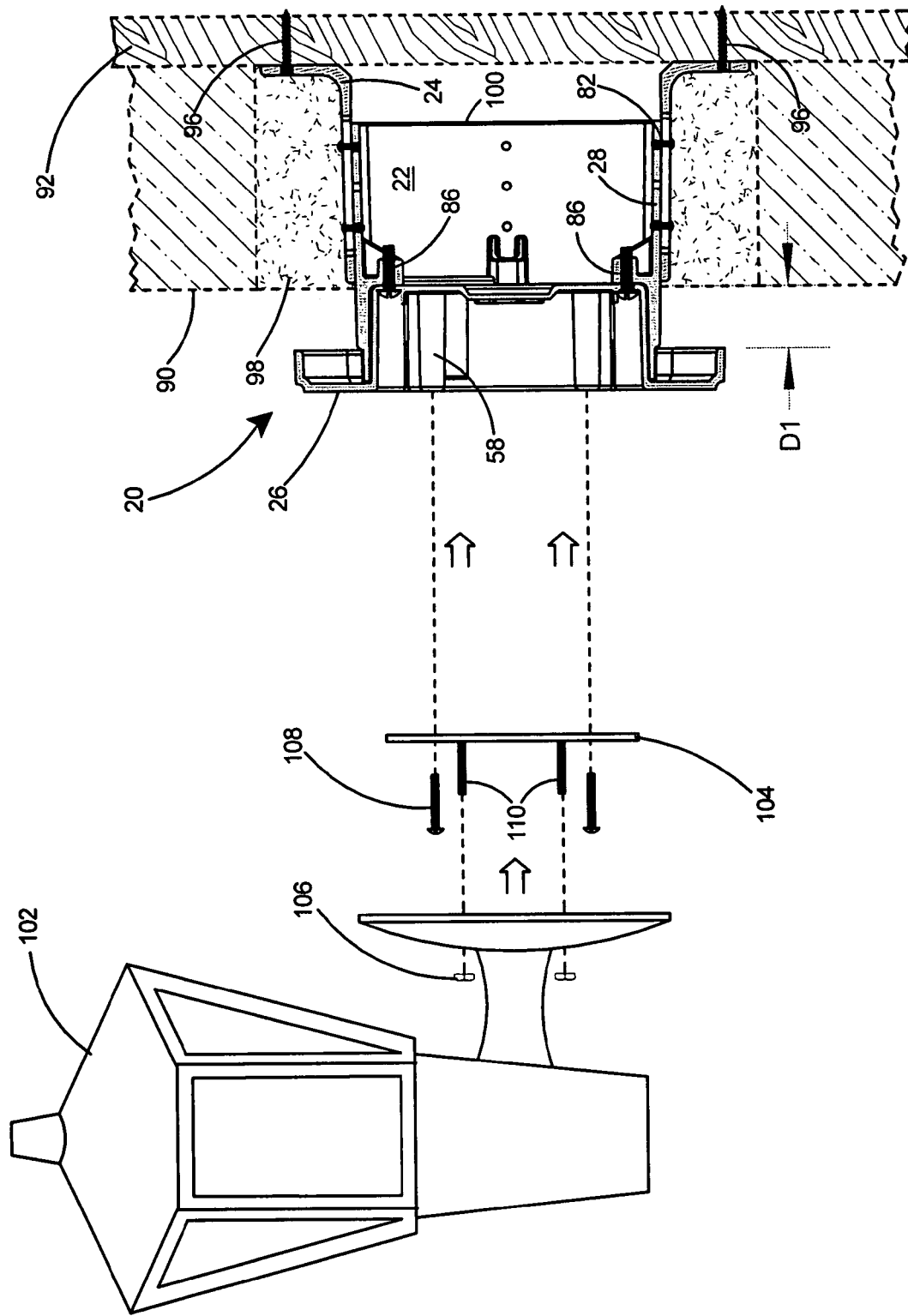
FIG. 19 is a side view of an adjustable electrical box assembly according to the present invention depicting the electrical box installed at a distance D1 offset from the wall.

FIG. 19 depicts an adjustable electrical box assembly 20 according to the present invention installed on a brick wall 90 at an offset from the wall. To offset the electrical box 26 from the wall, anchoring members 24 are secured to the sidewalls 28 of the base member 22 in such a manner that the base legs 72 extend behind the rear edge 100 of the base member 22. The light fixture 102 is therefore installed at an offset distance D1 from the wall 90. After the adjustable electrical box assembly 20 has been secured to the wall 90, the space between the brick wall 90 and the base member 22 is filled with mortar 98.

With reference to the first embodiment of FIG. 1, the present invention is an adjustable electrical box assembly 20 including a base member 22, one or more anchoring members 24, and an electrical box 26. The adjustable electrical box assembly 20 can be used to mount an electrical device to a brick or stone wall (not shown), either flush with the wall or at a predetermined offset based on the user's preference.

Figure 20:
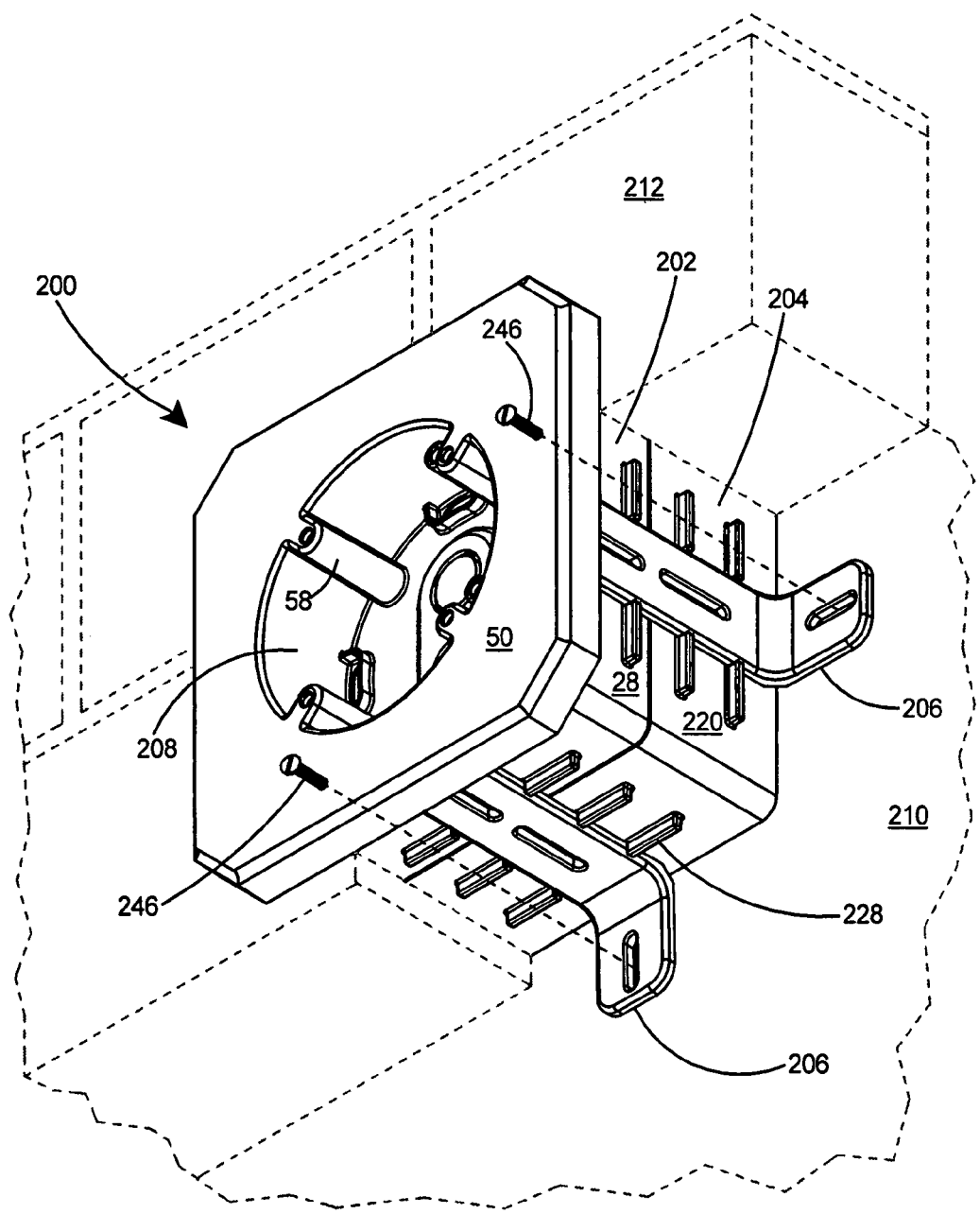
FIG. 20 is a perspective view of a second and preferred embodiment of an adjustable electrical box assembly according to the present invention.
Figure 21:
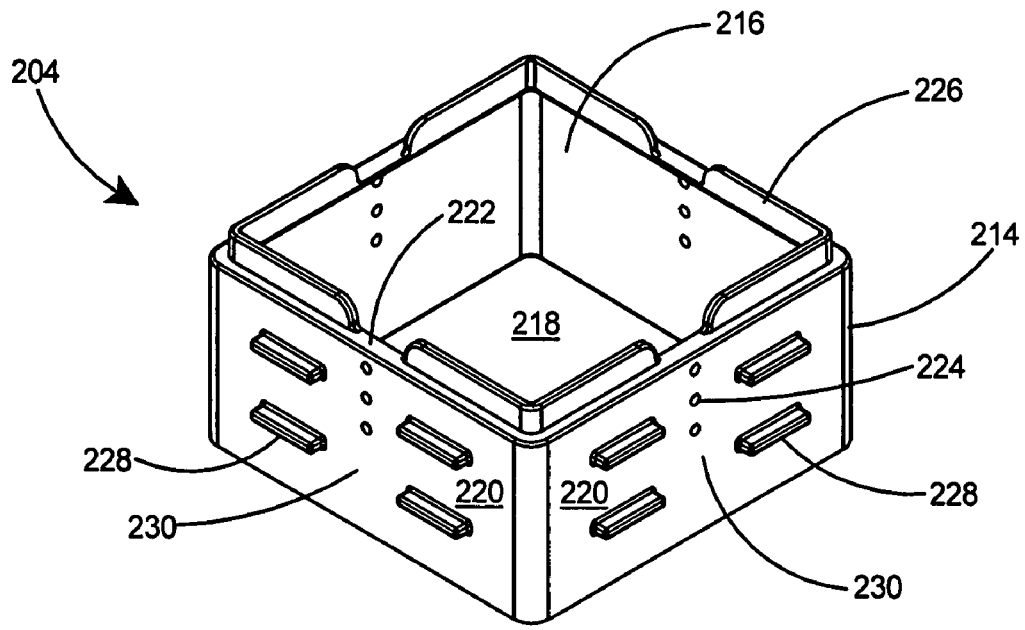
FIG. 21 is a perspective view of a box extender that forms a portion of the adjustable electrical box assembly of the present invention.
Figure 22:
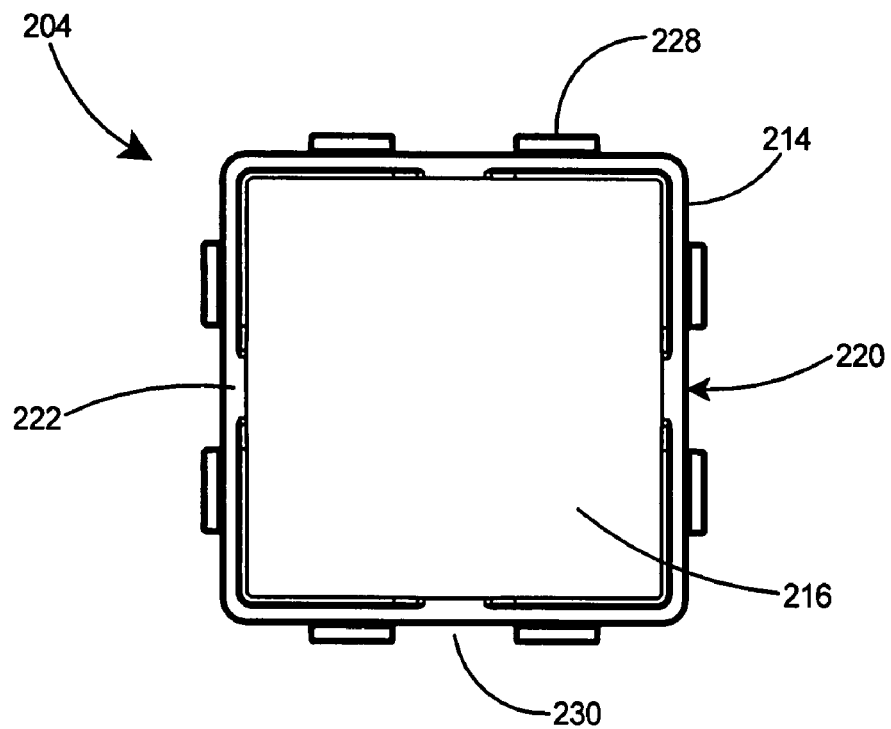
FIG. 22 is a top view of the box extender of FIG. 21.
Figure 23:
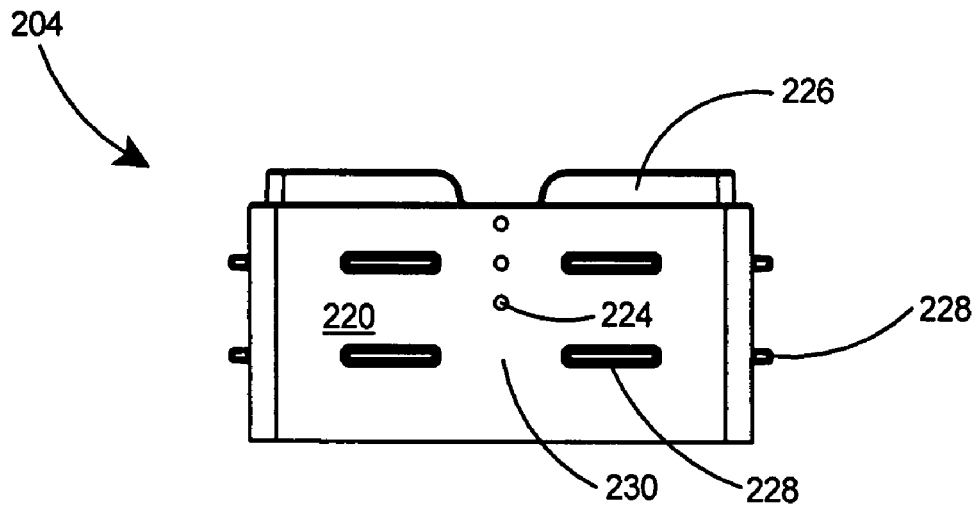
FIG. 23 is a side view of the box extender of FIG. 21.
Figure 24:
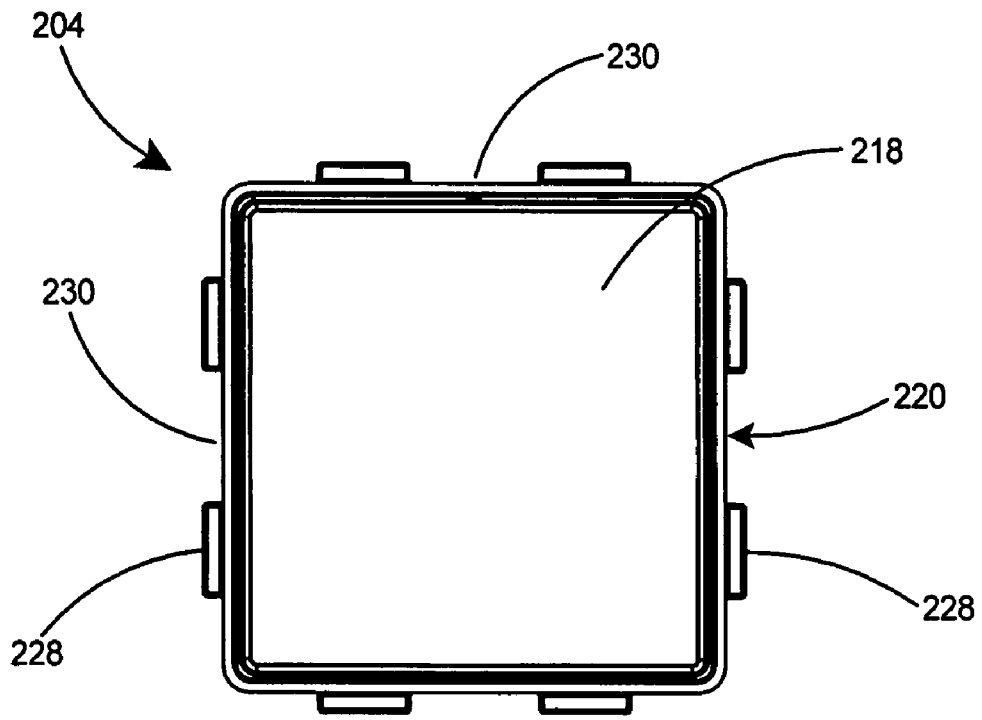
FIG. 24 is a bottom view of the box extender of FIG. 21.
Figure 25:
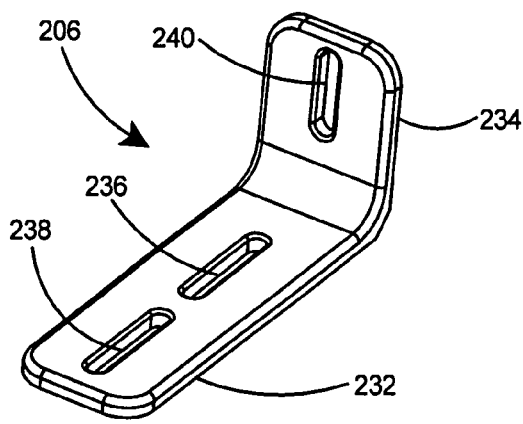
FIG. 25 is a perspective view of one of the anchoring members that forms a portion of the adjustable electrical box assembly of FIG. 20.
Figure 26:
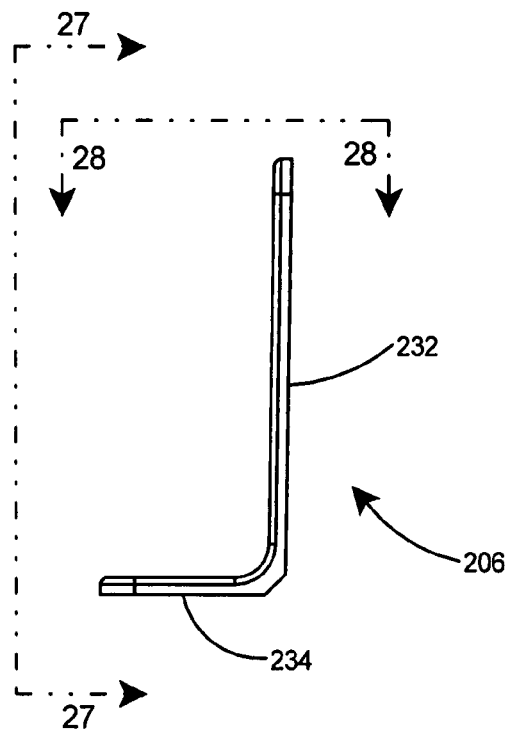
FIG. 26 is a side view of the anchoring member of FIG. 25.
Figure 27:
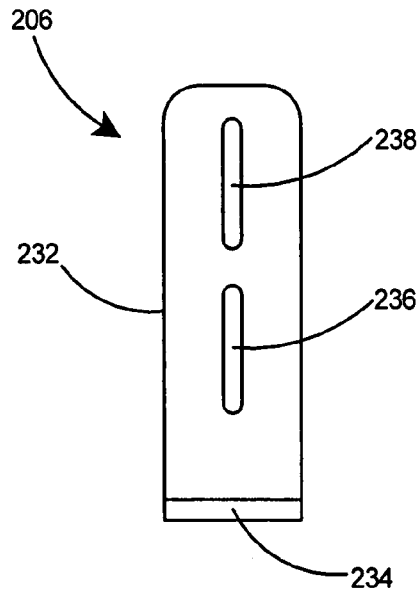
FIG. 27 is a front view of the anchoring member taken along line 27-27 of FIG. 26.
Figure 28:
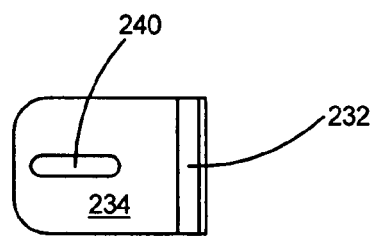
FIG. 28 is a top view of the anchoring member taken along line 28-28 of FIG. 26.

With reference to FIG. 20, there is shown the preferred embodiment of the present invention, an adjustable electrical box assembly 200 including a base member 202, an optional base extender 204, one or more anchoring members 206, and an electrical box 208. The adjustable electrical box assembly 200 is used to mount an electrical device primarily to the substrate 210 underlying a stone wall 212, either flush with the wall or at a predetermined offset based on the user's preference. The base extender 204 portion of the a adjustable electrical box assembly 200 can be omitted for those installations in which the stone that will be installed over the substrate 210 is relatively thin and the base member 202 alone is sufficient to extend the electrical box 208 beyond the surface of the overlying stone.

As shown in FIGS. 21-24, the preferred embodiment of the base extender 204 includes a frame member 214 including an open top 216, an open bottom 218, and sidewalls 220 having a top edge 222. A plurality of apertures 224 are provided in the sidewalls 220 of the base extender 204, with the apertures 224 aligned longitudinally along the sidewalls 220. The base extender 204 also includes a peripheral lip 226 extending from the top edge 222 of the sidewalls 220. A plurality of tabs 228 are provided extending outward from the sidewalls 220 of the base extender 204. The tabs 228 are aligned in columns along the sidewalls 220 of the base extender 204 with a column of tabs 228 disposed on each side of the line of apertures 224 thereby defining a longitudinal gap 230 along each sidewall 220 of the base extender 204.

With reference to FIGS. 25-28 there is shown an anchoring member 206 that forms a portion of the preferred embodiment of the adjustable electrical box assembly of the present invention. The substantially L-shaped anchoring member 206 includes a long leg 232 and a short leg 234. The anchoring member 206 includes one or more slots, including an inner slot 236 and an outer slot 238, arranged longitudinally in the long leg 232 and a slot 240 arranged longitudinally in the short leg 234.

Figure 29:
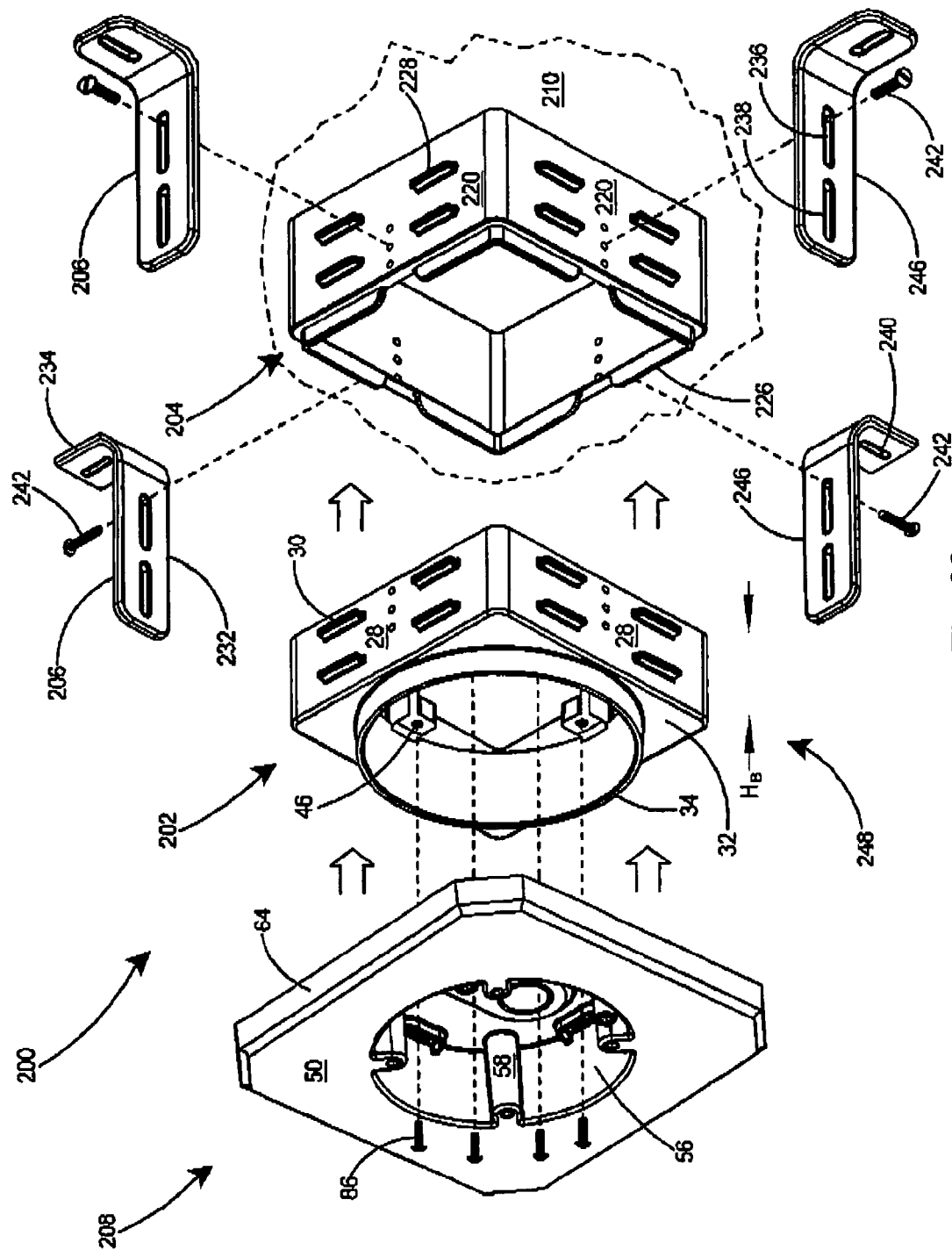
FIG. 29 is an exploded perspective view of a second and preferred embodiment of an adjustable electrical box assembly according to the present invention.

Referring to FIG. 29, there is shown an exploded perspective view of the second and preferred embodiment of an adjustable electrical box assembly 200 according to the present invention. The electrical box 208, base member 202, and base extender 204 are shown in alignment to form an adjustable electrical box assembly 200. Four anchoring members 206 are in alignment with each sidewall 220 of the base extender 204 to be secured thereto with fasteners 242. The base extender 204 is used when necessary for extending the electrical box 208 and base member 202 farther from the substrate 210 when the base member 202 alone is not sufficient to extend the peripheral flange 50 of the electrical box 208 beyond the wall covering (not shown).

Figure 31:
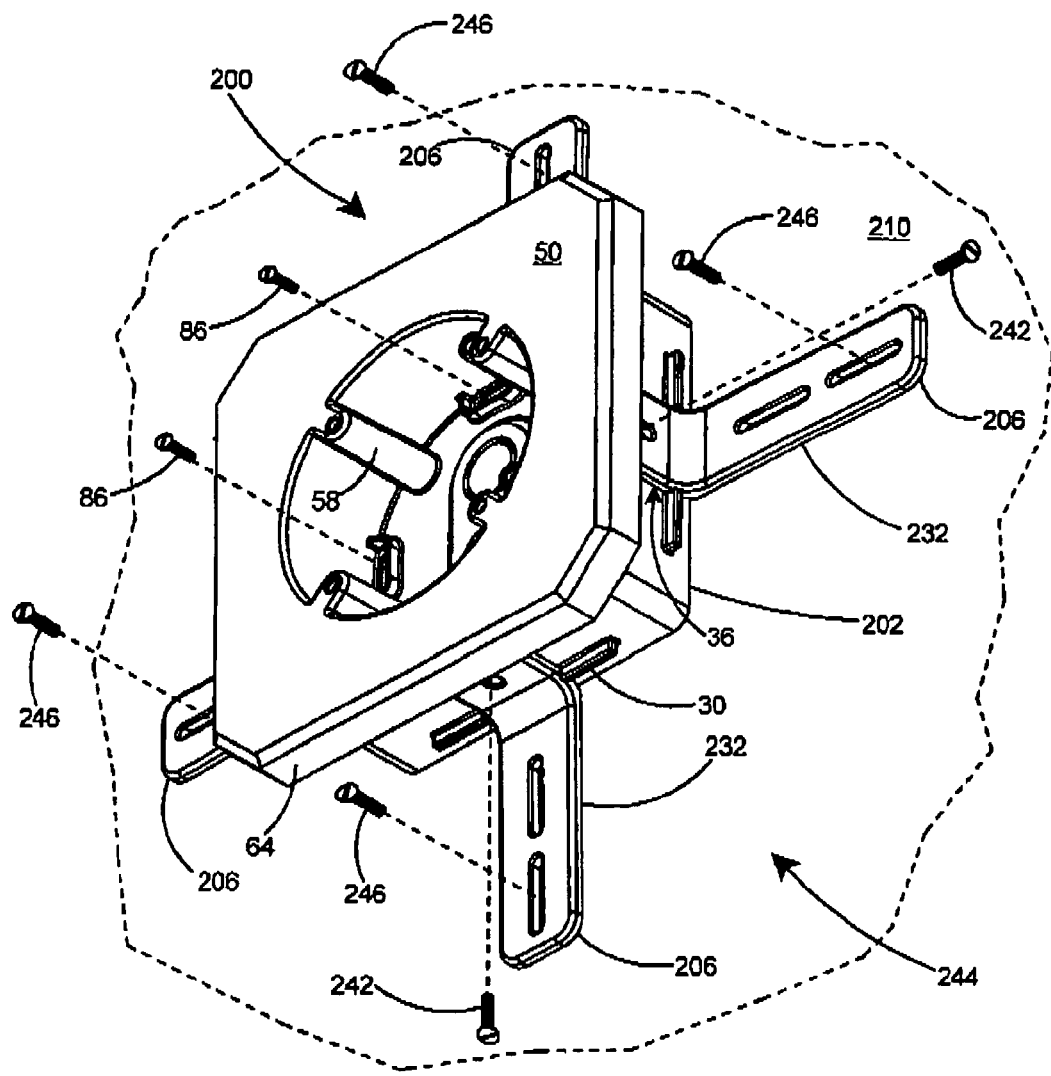
FIG. 31 is a perspective view of a second and preferred embodiment of the adjustable electrical box assembly with the optional box extender omitted and the anchoring members rotated to accommodate a smaller thickness of stone.

With reference to FIG. 31, there is shown a first mounting arrangement 244 that is used when the height of the sidewalls 28 of the base member 202 is greater than the thickness of the wall covering (not shown). The electrical box 208 is first secured to the base member 202 with fasteners 86 in the same manner as that shown for the first embodiment in FIG. 12. As shown in FIG. 31, in the first mounting arrangement 244 the short leg 234 of the anchoring member 206 is secured to the sidewall 28 of the base member 202 with fasteners 242 and the long leg 232 of the anchoring member 206 is secured to the substrate 210 with fasteners 246 to secure the electrical box assembly to the substrate 210. The short leg 234 of the anchoring member 206 is slideable within the gap 36 between the tabs 30 of the base member 202 and the position of the short leg 234 with respect to the sidewalls 28 of the base member 202 is selected to arrange for the desired offset of the electrical box 208 from the wall.

Figure 30:
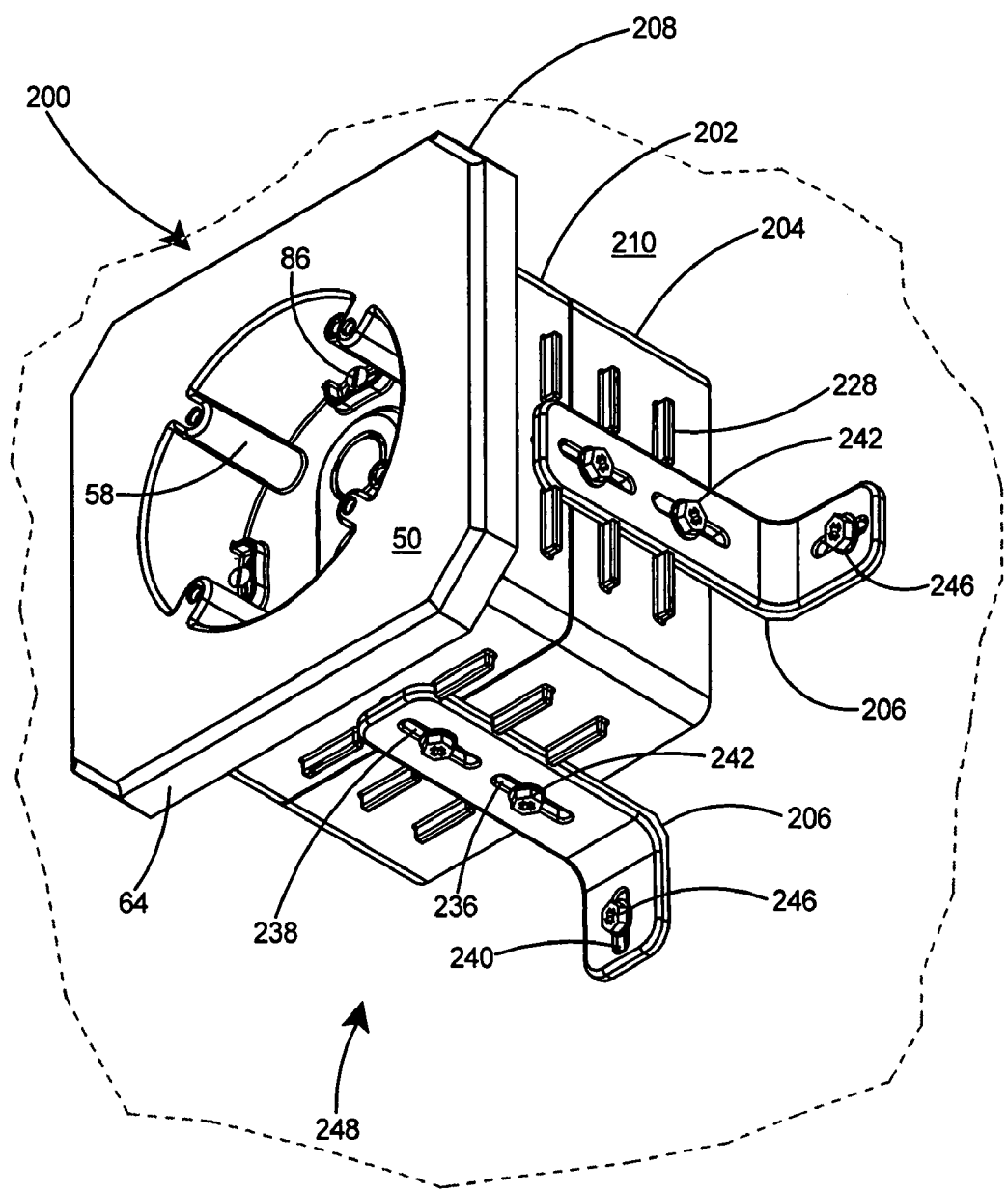
FIG. 30 is a perspective view of the second and preferred embodiment of the adjustable electrical box assembly with the anchoring members extended to accommodate a greater thickness of stone.

With reference to FIG. 29, there is shown a second mounting arrangement 248 that is used when the height $H_B$ of the sidewalls 28 of the base member 202 is less than the thickness of the wall covering (not shown). The electrical box 208 is first secured to the base member 202 with fasteners 86. The lip 34 of the base member 202 is substantially circular-shaped and the peripheral lip 226 of the base extender 204 is substantially square-shaped. In the second mounting arrangement 248, the long leg 232 of the anchoring member 206 is then secured to the sidewall 28 of the base member 202 and to the sidewall 220 of the base extender 204. The short leg 234 of the anchoring member 206 is then secured to the substrate 210. An adjustable electrical box assembly 200 according to the second mounting arrangement 248 is shown fully assembled and secured to a substrate 210 in FIG. 30.

Referring to FIG. 20, in a structure being newly constructed, after the adjustable electrical box assembly 200 is secured to the substrate 210, the stone 212 is secured around the electrical box assembly. Conversely, for an existing structure, a hole large enough to accommodate the electrical box assembly 200 including the anchoring members 206 is created in the stone 212 to expose the substrate 210, the assembly 200 is secured to the substrate 210 with fasteners 246, and mortar is inserted between the stone and the electrical box assembly 200 to fill the resultant hole. The peripheral flange 50 of the electrical box 208 extends laterally substantially beyond the sidewalls 28 of the base member 202 to provide an aesthetically pleasing installed electrical box.

After the preferred embodiment of the adjustable electrical box assembly is secured to the substrate and mortared in place, an electrical fixture is secured to the electrical box in the same manner as for the first embodiment. As shown in FIG. 19, the bosses 58 of the electrical box 26 are capable of receiving fasteners 108 there through from the bracket 104 of an electrical fixture 102 for securing the electrical fixture 102 to the adjustable electrical box assembly.

In the present invention, although it may be constructed of metal, the base member is preferably molded in one piece of plastic. The electrical box may also be constructed of metal but preferably is molded in one piece of plastic. The base extender preferably is molded of plastic in one piece.

Having thus described the invention with reference to a preferred embodiment, it is to be understood that the invention is not so limited by the description herein but is defined as follows by the appended claims.

What is claimed is:

1. An adjustable electrical box assembly for mounting an electrical device on a wall having a substrate and a wall covering thereon comprising:
   a base member including sidewalls having a base edge, a top wall, and a circular lip extending from said top wall;
   an electrical box secured to said base member, said electrical box including sidewalls, a back wall, and a peripheral flange;
   one or more L-shaped anchoring members, said anchoring members including a short leg and a long leg;
   an optional base extender for extending said electrical box and base member farther from said substrate when said base member alone is not sufficient to extend said peripheral flange of said electrical box beyond said wall covering; and
   said anchoring members for adjusting the distance of said base extender with respect to said substrate.

2. The adjustable electrical box assembly of claim 1 wherein said base extender includes
   a frame member including an open top, an open bottom, and sidewalls having a top edge;
   a plurality of apertures in said sidewalls of said base extender, said apertures aligned longitudinally along said sidewalls of said extender; and
   a peripheral lip extending from said top edge of said sidewalls.

3. The adjustable electrical box assembly of claim 2 including a second mounting arrangement of said assembly wherein
   said sidewalls of said base member include a height;
   said height of said sidewalls of said base member is less than the thickness of the wall covering;
   said base edge of said sidewalls of said base member is telescopically received on said peripheral lip of said base extender;
   said long leg of said anchoring member is secured to said sidewall of said base member and to said sidewall of said base extender; and
   said short leg of said anchoring member is secured to the substrate.

4. The adjustable electrical box assembly of claim 2 including a plurality of tabs extending outward from said sidewalls of said base extender.

5. The adjustable electrical box assembly of claim 4 wherein
   said tabs are aligned in columns along said sidewalls of said base extender; and
   said base extender includes a longitudinal gap along said sidewalls of said base extender between said columns of tabs.

6. The adjustable electrical box assembly of claim 5 wherein
   said short leg of said anchoring member is slideable within said longitudinal gap between said tabs of said base member; and
   the position of said short leg with respect to said sidewalls of said base member is selected to arrange for the desired offset of said electrical box from the wall.

7. The adjustable electrical box assembly of claim 1 including a first mounting arrangement of said assembly wherein
   said sidewalls of said base member include a height;
   said height of said sidewalls of said base member is greater than the thickness of the wall covering
   said short leg of said anchoring member is secured to said sidewall of said base member; and
   said long leg of said anchoring member is secured to the substrate.

8. The adjustable electrical box assembly of claim 1 including
   a plurality of apertures in said sidewalls of said base member, said apertures aligned longitudinally along said sidewalls of said base member; and
   a plurality of tabs extending outward from said sidewalls of said base member.

9. The adjustable electrical box assembly of claim 8 wherein
   said tabs are aligned in columns along said sidewalls of said base member; and
   said base member includes a longitudinal gap along said sidewalls between said columns of tabs.

10. The adjustable electrical box assembly of claim 1 including
    an inner periphery on said lip of said base member;
    one or more bosses integral with said lip of said base member; and
    said bosses arranged around said inner periphery of said lip.

11. The adjustable electrical box assembly of claim 10 including a bore in each of said bosses.

12. The adjustable electrical box assembly of claim 10 including apertures in said back wall of said electrical box.

13. The adjustable electrical box assembly of claim 12 wherein
    said sidewalls of said electrical box are telescopically received within said lip of said base member; and
    fastening of said electrical box to said base member includes securing fasteners through said apertures in said back wall of said electrical box into said bosses of said base member.

14. The adjustable electrical box assembly of claim 13 wherein said peripheral flange of said electrical box extends laterally substantially beyond said sidewalls of said base member when said electrical box is secured to said base member.

15. The adjustable electrical box assembly of claim 1 wherein said anchoring member includes
    a slot arranged longitudinally in said long leg; and
    a slot arranged longitudinally in said short leg.

16. The adjustable electrical box assembly of claim 1 wherein said electrical box includes a plurality of bosses integral with and extending from said sidewalls of said electrical box;

bores in said bosses; and one or more removable wall sections in said back wall of said electrical box, said removable wall sections forming knockouts in said back wall of said electrical box.

17. The adjustable electrical box assembly of claim 16 wherein said bores in said bosses of said electrical box are capable of receiving fasteners there through from the bracket of an electrical fixture for securing the electrical fixture to said adjustable electrical box assembly.

18. The adjustable electrical box assembly of claim 1 including an apron integral with and extending rearward from said peripheral flange of said electrical box; and an electrical enclosure defined by said sidewalls and said back wall.

19. The adjustable electrical box assembly of claim 1 wherein said base member is molded in one piece of plastic;

said electrical box is molded in one piece of plastic; and said anchoring member is formed in one piece of plastic or metal.

* * * * *